May 26, 1931.  J. G. RITTER  1,807,048
EARTH BORING SYSTEM
Filed March 6, 1928
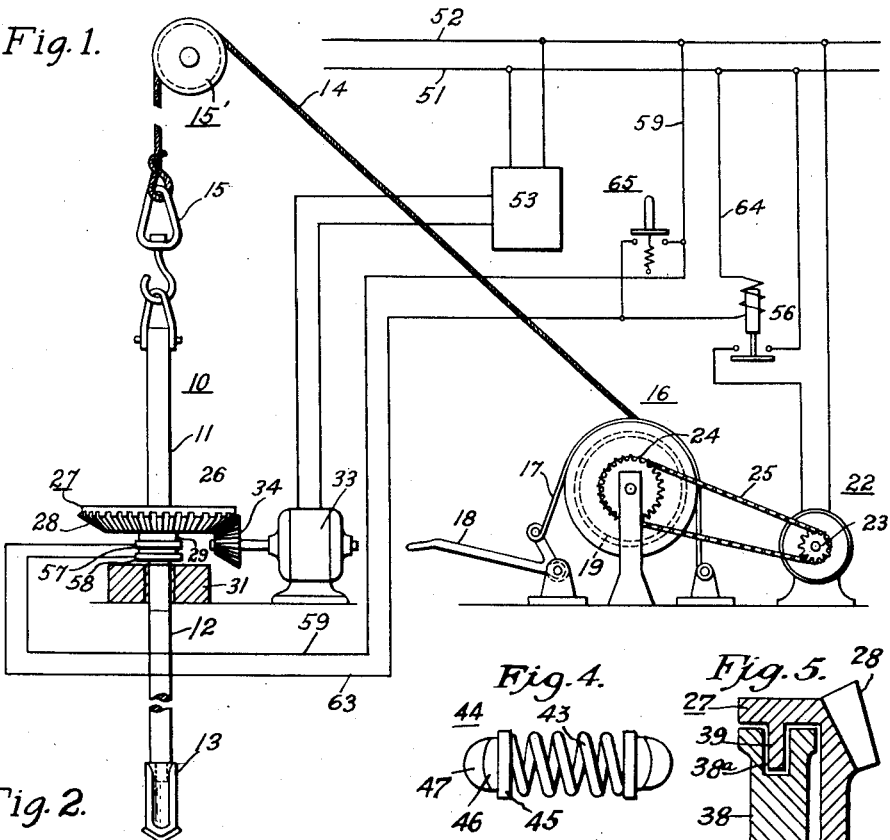
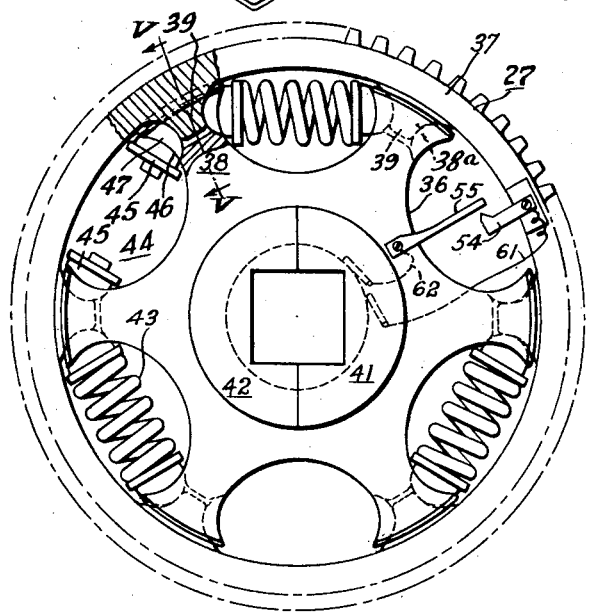
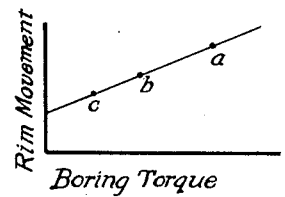
INVENTOR
John Gilbert Ritter.
BY
ATTORNEY Patented May 26, 1931

1,807,048

UNITED STATES PATENT OFFICE

JOHN G. RITTER, OF NORWOOD, PENNSYLVANIA, ASSIGNOR TO WESTINGHOUSE ELECTRIC & MANUFACTURING COMPANY, A CORPORATION OF PENNSYLVANIA

EARTH BORING SYSTEM

Application filed March 6, 1928. Serial No. 259,441.

The invention relates generally to earth-boring systems and more particularly to earth-boring systems of the rotary type, wherein the feed of the rotatable-boring tool is manually controlled.

In operating earth-boring systems of the rotary type, it is a usual practice to regulate the downward movements or feed of the boring tool by means of a manually operated brake provided on the hoisting drum upon which the flexible cable or wire line which supports the boring tool is wound. The brake is operated by the operator or attendant, who, when experienced, is guided by a highly developed sense of touch and hearing, to regulate the rate of feed in accordance with the existing operating conditions. Since the boring resistance is variable and constantly changing, it will be readily seen that great difficulty may be encountered in judging the safe and most efficient feeding rate.

The operator-controlled brake method of operation is unsatisfactory in many ways, particularly because of the damage that may be done to the boring tool in the event that the operator misjudges the rate of feed which may be safely maintained.

In the operation of electrically-driven earth-boring systems of the rotary type, either a current or power-indicating instrument may be utilized to indicate to the operator or attendant the power being consumed by the drilling motor. While this serves to protect against an overload being sustained for any appreciable length of time, it does not provide the necessary degree of protection against sudden overloads which may occur without warning. Furthermore, no provision is made for automatically retrieving the boring tool to quickly relieve an overloaded condition, and, therefore, the provision of a meter does not give the desired degree of protection to the boring tool and other equipment.

The object of this invention, generally stated, is to provide for protecting the boring tool of an earth-boring system under all operating conditions.

A more specific object of the invention is to provide for limiting the torque which may be applied to the boring tool of an earth-boring system to prevent damage to either the stem or the bit portion of the tool, upon the occurrence of sudden overloads.

Another object of the invention is to provide for automatically hoisting the boring tool, when a predetermined torque is applied to the drill stem by the drill motor, thereby to diminish the contact pressure on the bit.

A further object of the invention is to provide for automatically retrieving the boring tool in response to predetermined maximum torque being applied therto.

Other objects of the invention will become evident from the following description taken in conjunction with the drawings, in which:

Figure 1 is a diagrammatic view of a rotary-earth-boring system organized in accordance with the present invention, Fig. 2 is a plan view of the rotary table or power-transmission device, as shown in Fig. 1, Fig. 3 is a graph showing the operating characteristics of the rotary table shown in Fig. 2, Fig. 4 is a view showing a connecting spring with spring retaining members attached, and Fig. 5 is a sectional view, taken along the line V—V of Fig. 2.

Referring to Fig. 1 of the drawings, the system shown includes a boring tool 10 comprising a grief stem 11, a section of drill pipe 12 and a drill bit 13 connected together by suitable screw-threaded joints.

In order to control the downward feed of the boring tool 10, it is supported by a flexible cable 14 and a swivel hook 15 which engages a supporting device pivotally connected to the grief stem 11. It will be readily understood that this arrangement permits the boring tool 10 to rotate without twisting the supporting cable 14.

The boring tool 10 is maintained in the proper operating position by passing the flexible cable 14 over a sheave 15' which may be supported at the top of a suitable derrick or similar structure in accordance with the usual practice.

A hoisting mechanism 16 is provided for winding the cable 14 to raise or lower the boring tool 10 and thereby regulate the downward feed, in a manner that will be hereinafter described in detail.

In this particular embodiment of the invention, the hoisting mechanism 16 is provided with a band brake 17 and an operating lever 18, which may be utilized to control the rotation of the drum 19. As shown, a motor 22 is provided for operating the hoisting mechanism 16. As will be observed, the motor 22 is connected to the drum 19 by means of sprocket wheels 23 and 24 and a drive chain 25. However, it is to be understood that any other suitable drive may be employed.

In order to perform boring operations, the boring tool 10 may be rotated by means of a rotary table or power transmitting device, of any suitable type, through which power may be transmitted from a motor. However, in this invention, a rotary table of an improved type is utilized which is designated generally by the numeral 26.

As shown, the rotary table 26 comprises a table element 27 which is provided with gear teeth 28 on the rim portion and a bearing member 29 which is rotatably supported by a suitable block or lower bearing member 31. The lower bearing member 31 is located directly over the bore hole and is provided with an opening through which the boring tool 10 may pass.

Power for driving the rotary table 26 may be supplied from any suitable motor and, in this instance, an electric motor 33 is provided. For the sake of simplicity in illustration, the motor 33 is shown connected directly to the rotary table 26 through a bevel driving pinion 34, carried by the motor shaft and disposed to mesh with the gear teeth 28 on the rim portion of the table element 27.

In order to provide for eliminating any sudden shocks which may be reflected upon the drilling motor 33 through the rotary table 26, the table portion 27 is constructed as shown in detail in Fig. 2.

It will be observed that the table portion 27 comprises a hub member 36 and a rim member 37. The hub member 36 is provided with a plurality of radially extending spoke members 38 having end portions provided with circumferentially extending slots 38a. The rim member 37 is provided with a similar number of lug members 39 which are disposed to engage the slots 38a in the spokes 38 and thereby maintain the hub and rim portions in their proper relation as shown in Fig. 5. The hub member 36 is also provided with a circular central opening which is adapted to accommodate a pair of jaw members 41 and 42 which form a smaller opening through which the grief stem 11 extends. It is to be understood that this opening so formed by the jaw members 41 and 42 is of substantially the same shape and size as the grief stem 11, and, therefore, when the table element 27 is rotated, the boring tool 10 is also rotated at the same speed, and, since the grief stem 11 is of considerable length, upward or downward movement of the boring tool 10 may be had, regardless of whether or not the table is rotating.

In order to protect the drive from sudden shocks which may occur when the boring tool becomes overloaded, the hub member 36 and rim member 37 of the rotary table 26 are connected by means of a plurality of coil springs 43, which permit a limited relative movement between the hub and rim members.

The connecting springs 43 may be mounted in any suitable manner to provide a resilient connection between the hub member 36 and rim member 37. However, in this embodiment of the invention, spring retainers 44 are utilized. As shown, the spring retainers 44 are formed to provide a seat portion 45 for receiving the spring 43, having a lug portion 47 extending therefrom, disposed to extend within the slot 38a and engage the circular contact surface of the lug 39, as shown. The lug portion 47 of the spring retainer 44 is provided with a shoulder portion 46, having a circular contact face disposed to engage the correspondingly shaped contact surface of the end of the spokes 38.

In order to illustrate how the connecting springs 43 function to permit relative movement between the rim and hub members, it may be assumed that the torque applied to the rim becomes great enough to overcome the combined compression forces of all the connecting springs 43.

In this instance, if the rim member 37 is being urged in a counterclockwise direction against the opposing force of the hub member 36, each lug member 39 will act against the end of the lug portion 47 of the spring retainers 42, thereby actuating the shoulder portion 46 of the corresponding spring retainers 43 out of engagement with the circular contact surface of the spokes 38. The opposite ends of the connecting springs 43 act against the adjacent spokes 38, since the shoulder portion 46 of the spring retainers holding that end of the springs 43 engages the contact faces of the adjacent spokes 38.

Therefore, it is evident that the compression of the connecting springs 43 permits the rim member 37 to assume different positions with respect to the hub member 36, depending upon the difference in forces tending to rotate the hub and rim members in opposite directions.

In operating the system, the drilling motor 33 may be started by connecting it to a suitable source of electric power such, for example, as the line conductors 51 and 52, by means of a starter 53. Assuming that the boring tool 10 is supported at some distance above the bottom of the bore hole, the drum brake 17 is released by the operator, then the hoist drum 19 is subjected to the weight of the boring tool 10, and is unwound until the bit 13 reaches the bottom. As the drilling operation continues, the boring tool 10 is continuously fed downward by releasing the brake band 17 to permit the drum 19 to slowly unwind the cable 14.

In order to automatically retrieve the boring tool 10, thereby limiting the torque applied by the drilling motor 33 in the event that the boring resistance increases to a predetermined degree, contact members for controlling the operation of the hoist motor 22 are provided on the rotary table 26 and disposed to be actuated into and out of engagement by the relative movement of the hub and rim portions.

As shown in Fig. 2, circuit-controlling contact members 54 and 55 are mounted upon the rim and hub portions, respectively. The conductors 59 and 63 of the actuating circuit for the main-line switch 56 are connected to the contact members 54 and 55 through suitable slip rings 57 and 58 and connecting leads 61 and 62 which are carried by the bearing member 29 of the rotary table 26.

It is to be understood that the contact members 54 and 55 may be spaced in any desired relation to attain an operating characteristic such as is shown in Fig. 3.

Referring to Fig. 3, it will be observed that the degree of rim movement or the relative movement between the rim portion 37 and hub portion 36 is a function of the boring torque or the torque applied to the boring tool 10 by the drilling motor 33. Therefore, by spacing the contact members 54 and 55 at various positions, the maximum torque applied to the boring tool 10 may be varied or controlled at the will of the operator.

Assuming that the boring tool 10 encounters a high resistance, the drill motor 33 may deliver a torque of sufficient magnitude to cause a twist-off of either the drill pipe 12 or the drill bit 13 if the drive is not resilient. In the present system, relative movement between the rim portion 37 and the hub portion 36 will instantly occur, causing the contact member 54 to engage contact member 55, and establish a circuit which may be traced from the line conductor 52, through conductor 59, slip ring 58, connector 61, contact members 54 and 55, connector 62, slip ring 57, conductor 63, operating coil of the line switch 56 and conductor 64 to line conductor 51.

Upon the closure of line switch 56, an energizing circuit for the hoist motor 22 is established, whereupon the hoist drum 19 is actuated to hoist the boring tool 10 and thereby relieve the pressure of the bit 13 on the bottom of the hole.

It will be readily understood that, upon the reduction of the bit pressure, the drilling resistance will be immediately decreased, the contact members 54 and 55 disengaged and the hoisting motor 22 rendered inoperative. Since only a very slight reduction in bit pressure is necessary to reduce the load on the drill motor 33, it will be apparent that the upward movement of the tool 10 will be very slight, and, since the system has very little inertia, a very quick retrieving action will be obtained.

As set forth hereinbefore, the contact members 54 and 55 carried by the rotary table 26 may be adjusted angularly to obtain any spaced relation in order to readily adapt the rotary table to operate successfully with boring tools of different sizes.

In using the system described for hoisting purposes only, such, for example, as removing tools from the well or handling casings, the hoist motor 22 may be controlled by means of a push-button switch 65. Since the rotary table 26 does not operate during hoisting operations, complete control of the hoisting-motor line switch 56 may be had by operating the push-button switch 65.

It may be stated, in conclusion, that, while the illustrated example constitutes a practical embodiment of my invention, I do not wish to limit myself strictly to the exact details herein illustrated, since modifications of the same may be made without departing from the spirit of the invention as defined in the appended claims.

I claim as my invention:

1. In an earth-boring system, in combination, a gravity-feed boring tool, a motor for operating the boring tool, a drive member connected to the boring tool, a second drive member connected to the motor, said drive members being concentrically related resilient connecting means interposed between the drive members for transmitting power, said drive members being thereby relatively movable, the relative angular movement of the drive members being a function of the torque transmitted, means for controlling the feeding of the boring tool, means actuated by the drive members for controlling the operation of the feed-control means, said control means being responsive to a predetermined relative angular movement of the drive members, thereby to limit the torque transmitted to the boring tool.

2. In an earth-boring system, in combination, a gravity-feed boring tool, a motor for operating the boring tool, a drive member connected to the boring tool, a second drive member connected to the motor, resilient means interposed between the drive members for transmitting power, said drive members being thereby relatively movable, the relative angular movement of the drive members being a function of the torque transmitted, a hoist drum and cable for controlling the feeding of the boring tool, a motor for operating the hoisting drum, a source of power for the motor, a switch for connecting the hoist motor to the power source, circuit-controlling contact members carried by the drive members, said circuit-controlling contact members being disposed to engage, upon predetermined relative angular movement of the drive members, to operate the hoist-motor control switch, thereby causing the hoist motor to exert a lifting force upon the drilling tool.

3. In an earth-boring system, in combination, a boring tool, a motor for operating the boring tool, hoisting mechanism for supporting the boring tool, a motor for operating the hoisting mechanism, and power-translating means interposed between the boring tool and the motor for operating the boring tool, said power-translating means comprising an element driven by the motor and a second element carried thereby disposed for direct attachment to the boring tool, said second element being resiliently connected to the driven element to permit relative movement therebetween, and contact means disposed to be actuated by and in accordance with a predetermined relative movement of the two elements of the power-translating means for controlling the operation of the hoist motor.

4. In an earth-boring system, in combination, a boring tool for performing boring operations, a motor for operating the boring tool, hoisting mechanism for supporting the boring tool, said hoisting mechanism comprising a motor-actuated drum and a manually operated drum brake, a rotary table interposed between the boring tool and the motor for operating the boring tool, said rotary table comprising a rotatable member connected to the boring-tool operating motor, a second member carried by said rotatable element and means for resiliently connecting the two elements to permit relative movements therebetween, a contact member provided on each of said members, said contact members being disposed to control the operation of the motor-actuated drum in accordance with the movements of the relatively movable members of the rotary table.

5. In an earth-boring system, in combination, a boring tool, a motor for operating the boring device, power-translating means interposed between the boring tool and motor, said power-translating means comprising a rotatable member connected to the motor, a second member carried by the driven member and resiliently connected thereto disposed to engage the boring tool, means including a hoist drum for supporting the boring tool in proper relation to the bottom of the bore hole during the boring operation, a motor for operating the supporting means, and means carried by the relatively movable members of the power-translating means for setting said motor in operation to hoist the boring tool when the torque applied to the boring tool exceeds a predetermined value.

6. In an earth-boring system, in combination, a boring tool, a motor for operating the boring tool, power-translating means connected between the motor and the boring tool, said means comprising a rotatable member connected to the boring-tool operating motor, a second member carried by said rotatable member and means for resiliently connecting the two elements to permit relative movements therebetween in accordance with the torque exerted by the boring motor, a motor-actuated hoisting drum for supporting the boring tool, contact members carried by the relatively-movable members of the power-translating means disposed to control the operation of the motor-actuated drum, said contact members being adjustable relative to one another, whereby the hoist motor may be caused to respond to different torques exerted by the boring motor.

7. In an earth-boring system, in combination, a boring tool, a motor for actuating the boring tool, a drive member connected to the motor, a second drive member carried by the first drive member for engaging the boring tool, said drive members being resiliently connected and disposed for predetermined relative movements, a motor-operated hoist for controlling the feeding of the boring tool, a controller for said hoist motor, an operating circuit for the controller and contact members carried by the respective drive members, disposed to effect the energization of said controller-operating circuit in response to predetermined relative movements of said drive members.

8. In an earth-boring system, in combination, a boring tool, a motor for driving the boring tool, power-transmission means comprising a plurality of relatively-movable members disposed in concentric relation interposed between the motor and the boring tool, a plurality of spring members interposed between said members for opposing their relative movement whereby the relative angular movement of said members is a function of the torque applied to the boring tool, motor-operated means for exerting a lifting force on the boring tool to control the boring action, and contact means carried by said relatively-movable members and responsive to a predetermined relative angular movement of said members for controlling the operation of the lifting means.

In testimony whereof, I have hereunto subscribed my name this 5th day of March, 1928.

JOHN G. RITTER.